United States Patent
Nakazawa et al.

[11] Patent Number: 6,042,760
[45] Date of Patent: Mar. 28, 2000

[54] INJECTION MOLDING METHOD FOR AN INJECTION MOLDING MACHINE

[75] Inventors: Makoto Nakazawa; Masahiko Miyajima, both of Nagano, Japan

[73] Assignee: Nissei Plastic Industrial Co., Ltd., Nagano-ken, Japan

[21] Appl. No.: 09/085,015

[22] Filed: May 28, 1998

[30] Foreign Application Priority Data

Jun. 3, 1997 [JP] Japan ................................. 9-145268

[51] Int. Cl.⁷ .................................................. B29C 45/77
[52] U.S. Cl. ................ 264/40.1; 264/328.1; 364/475.05; 425/145
[58] Field of Search .................. 264/40.1, 40.5, 264/40.7, 69, 328.1, 328.8; 425/145, 149, 150, 166; 364/475.05

[56] References Cited

U.S. PATENT DOCUMENTS

| | | | |
|---|---|---|---|
| 5,554,326 | 9/1996 | Nakazawa et al. | 264/40.1 |
| 5,770,131 | 6/1998 | Bubel et al. | 264/69 |
| 5,786,999 | 7/1998 | Spahr et al. | 364/475.05 |
| 5,814,251 | 9/1998 | Arai et al. | 264/40.1 |

FOREIGN PATENT DOCUMENTS

| | | |
|---|---|---|
| 19510385 | 9/1995 | Germany . |
| 7-256712 | 10/1995 | Japan . |

*Primary Examiner*—Jill L. Heitbrink
*Attorney, Agent, or Firm*—Birch, Stewart, Kolasch & Birch, LLP

[57] ABSTRACT

An injection molding method for an injection molding machine in which molten resin in an injection barrel is injected and charged into a cavity of a mold through advancement of a screw in order to form a thin molding product. When the screw reaches a first set point that is set in advance and corresponds to completion of charge during the advancement of the screw, the screw is immediately and forcibly retracted to a second set point that is set in advance. With is operation, when the screw reaches the first set point X1 corresponding to completion of charge during the advancement of the screw, the internal pressure of the cavity is relieved quickly. Therefore, the cavity, which has deformed due to high pressure resin, is restored to its designed shape before the resin solidifies.

14 Claims, 4 Drawing Sheets

INJECTION MOLDING METHOD FOR AN INJECTION MOLDING MACHINE

BACKGROUND OF THE INVENTION

1. Fields of the Invention

The present invention relates to an injection molding method for an injection molding machine and is particularly suitable for molding very thin molding products.

2. Description of the Related Art

Conventionally, there has been known an injection molding method for an injection molding machine suitable for molding thin products such as compact discs, as disclosed in Japanese Patent Application Laid-Open (kokai) No. 7 (1995)-256712. In the molding method, the advancement stop position of a screw is set based on an amount of resin to be injected and charged into a mold, and a mold clamping pressure is set for the mold. Further, a mold opening amount is set for the mold based on the amount of resin to be charged. During injection/charge operation, the screw is advanced to the advancement stop position and is stopped at the advancement stop position for a predetermined period of time by means of position control, while the preset mold clamping pressure is applied to the mold which has been opened by the above-mentioned mold opening amount. Thus, variation in the amount of resin charged into the cavity of the mold is eliminated, resulting in uniform weight of molding products.

Recently, even very thin molding products having a thickness of about 0.1 mm, such as diaphragms of speakers, have been molded from a synthetic resin by means of injection molding. When such thin products are molded, an injection pressure higher than that employed for ordinary molding products is applied to molten resin during an injection/charge operation. Further, since, as shown in FIG. 5, the ratio of the area of a thin molding product M to the thickness thereof is considerably large, when the cavity C of the mold 4 deforms slightly in the thicknesswise direction due to resin pressure, the deformation ratio of the molding product M becomes considerably large. In addition, the molten resin in the cavity C solidifies immediately after the injection/charge operation. Therefore, in reality, proper molding cannot be performed through use of the method disclosed in the patent publication, in which the mold is opened by a predetermined mold opening amount and a preset mold clamping pressure is applied to the mold after resin is injected and charged into the mold.

In order to solve this problem, there has been proposed an injection molding method in which molten resin in injected and charged under high pressure into the cavity C of a mold in an opened state, and immediately after completion of charge, application of pressure to the screw is stopped and the pressure within the cavity C is relieved. However, this method has the following drawbacks.

First, since molten resin injected and charged into the cavity C quickly solidifies as described above, the molten resin solidifies while the cavity C is in a deformed state if the pressure relief is not performed completely. Therefore, thin molding products of high precision and high quality cannot be obtained.

Second, since the above-described problem becomes more remarkable as the thickness of thin molding products decreases or the area thereof increases, the thickness and shape of the think molding products are limited, so that the types of moldable thin products are limited.

SUMMARY OF THE INVENTION

An object of the present invention is to provide an injection molding method for an injection molding machine which enables highly precise and high quality molding of very thin products having a thickness of about 0.1 mm through quick relief of internal pressure of a cavity performed simultaneously with completion of charge.

Another object of the invention is to provide an injection molding method for an injection molding machine which can cope with changes in the shape of thin molding products such as a change in thickness or area, thereby enabling use for general purpose and expanded use.

In order to achieve the objects, the present invention provides an injection molding method for an injection molding machine in which molten resin in an injection barrel is injected and charged into a cavity of a mold through advancement of a screw in order to form a thin molding product, wherein when the screw reaches a first set point that is set in advance and corresponds to completion of charge during the advancement of the screw, the screw is immediately and forcibly retracted to a second set point that is set in advance. By virtue of this control, the internal pressure of the cavity is relieved quickly when the screw reaches the first preset point corresponding to completion of charge during the advancement thereof. Therefore, the cavity, which has deformed due to high pressure resin, is restored to its designed shape before the resin solidifies.

DESCRIPTION OF THE PREFERRED EMBODIMENT

An embodiment of the present invention will now be described in detail with reference to the drawings. The accompanying drawings are illustrative of the embodiment and are not meant to limit the scope of the invention. To clarify the invention, detailed descriptions of known parts are omitted.

Figure 2:
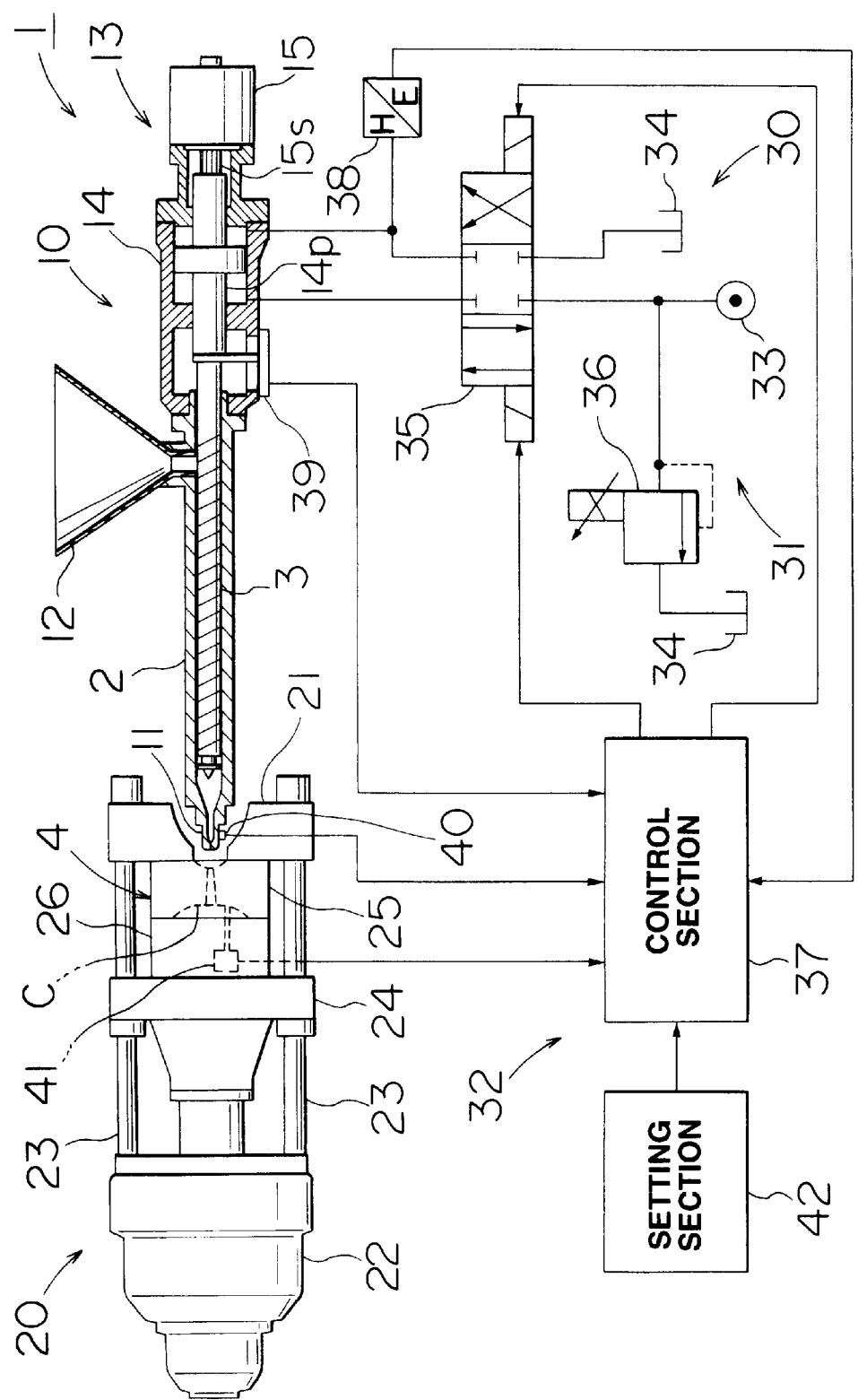
FIG. 2 is a partially sectioned view showing the overall structure of an injection molding machine in which the injection molding method can be practiced.

With reference to FIG. 2, there is first described the general structure of an injection molding machine 1 in which the injection molding method according to the present embodiment can be practiced.

The injection molding machine 1 includes an injection apparatus 10 and a mold clamping apparatus 20. The injection apparatus 10 includes an injection barrel 2, which has an injection nozzle 11 at its tip end. A hopper 12 is provided at the rear portion of the injection barrel 2. Further, a screw 3 is disposed within the injection barrel 2, and a screw drive section 13 is disposed at the rear of the injection barrel 2. The screw drive section 13 includes an injection cylinder 14 for advancing/retracting the screw 3 and an oil motor 15 for rotating the screw 3. The front end of the piston rod 14$p$ of the injection cylinder 14 is connected to the rear end of the screw 3, and the rotary shaft 15s of the oil motor 15 is in spline engagement with the rear end of the piston rod 14p.

Figure 5:
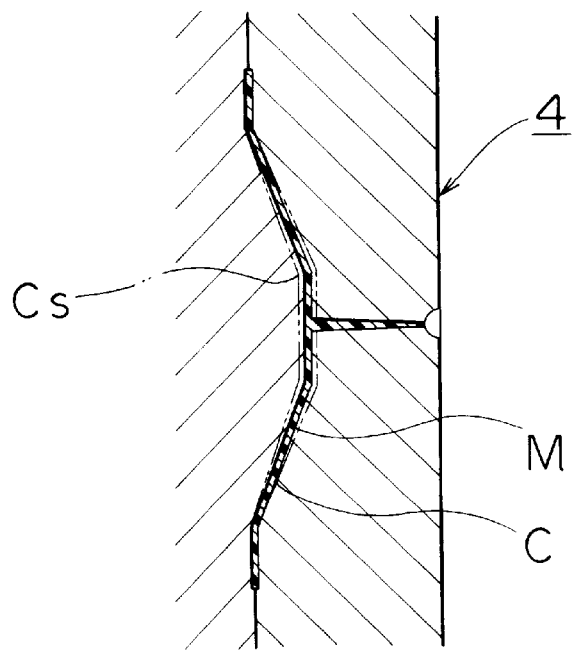
FIG. 5 is a cross-sectional view of a mold for describing a thin molding product and a prior art technique.

The die clamping apparatus 20 includes a stationary platen 21 fixed onto an unillustrated machine base, and a movable-platen drive section 22 fixed onto the machine base to face the stationary platen 21. Four horizontal tie bars 23 are disposed between the stationary platen 21 and the movable-platen drive section 22, and a movable platen 24 is slidably supported by the tie bars 23. The movable platen 24 is moved along the tie bars 23 by the movable-platen drive section 22. A stationary mold half 25 is attached to the stationary platen 21, while a movable mold half 26 is attached to the movable platen 24. The stationary mold half 25 and the movable mold half 26 constitute a mold 4. The mold 4 has a cavity C for molding a thin molding product M as shown in FIG. 5, specifically for molding a speaker diaphragm or the like having a thickness of about 0.1 mm.

Numeral 30 denotes a hydraulic drive apparatus for driving and controlling the mold clamping apparatus 20. In the drawing, there is shown only structural parts of the hydraulic drive apparatus related to the present embodiment, including a hydraulic circuit 31 and a controller 32. The hydraulic circuit 31 includes an oil pressure source 33, an oil tank 34, a control valve 35, and a release valve 36. The controller 32 includes a control section 37, to which are connected an oil pressure sensor 38 for detecting the oil pressure in the rear oil chamber of the injection cylinder 14, a position sensor 39 for detecting the position (speed) of the screw 3, a nozzle resin pressure sensor 40 for detecting the resin pressure in the injection nozzle 11, a mold interna l pressure sensor 41 for detecting the resin pressure within the cavity C, and a setting section 42. The position of the screw 3 detected by the position sensor 39 is fed to the control section 37 to be differentiated with respect to time, thereby being converted into speed information.

Figure 1:
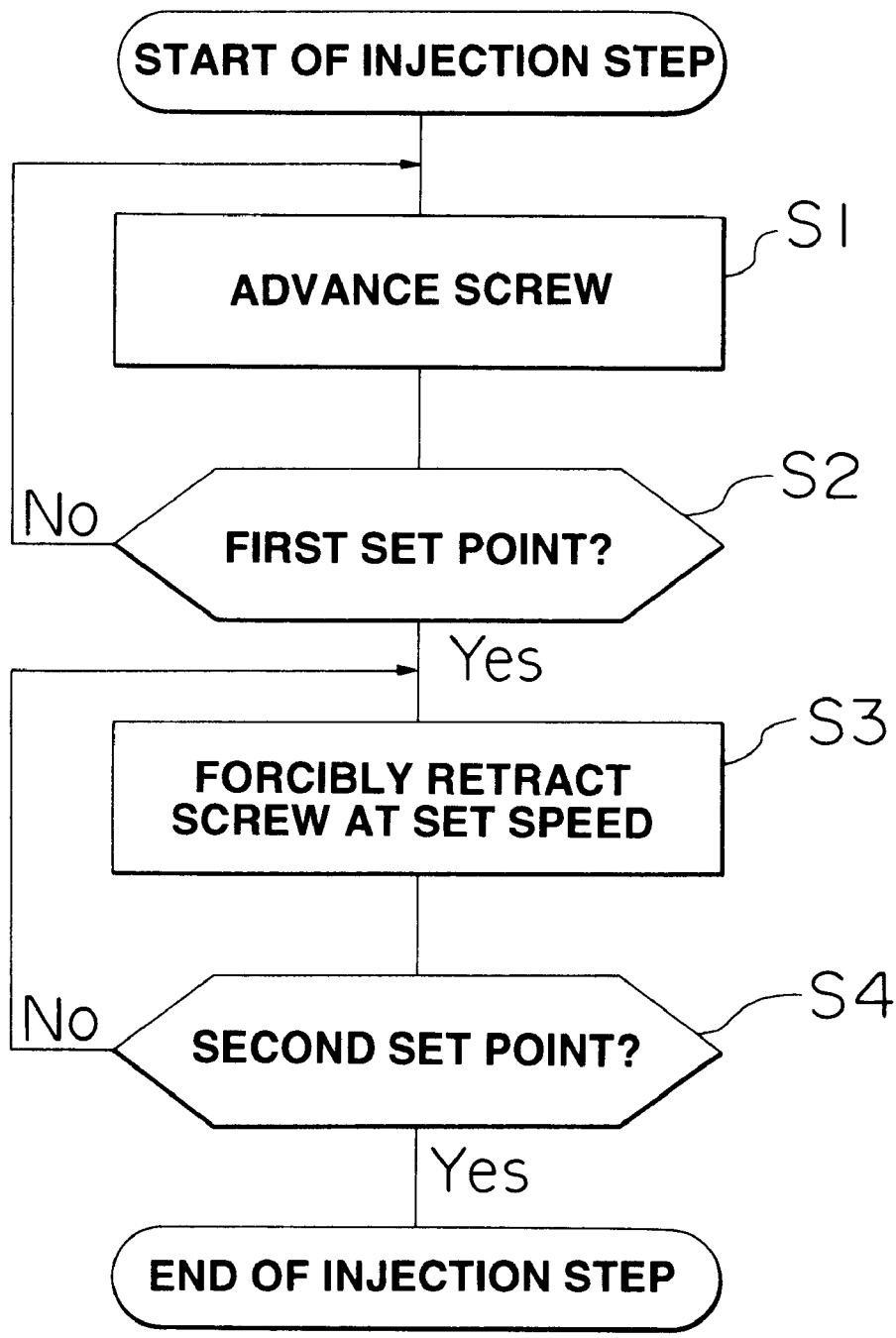
FIG. 1 is a flowchart showing the operation in the injection step of an injection molding method according to an embodiment of the present invention.
Figure 3:
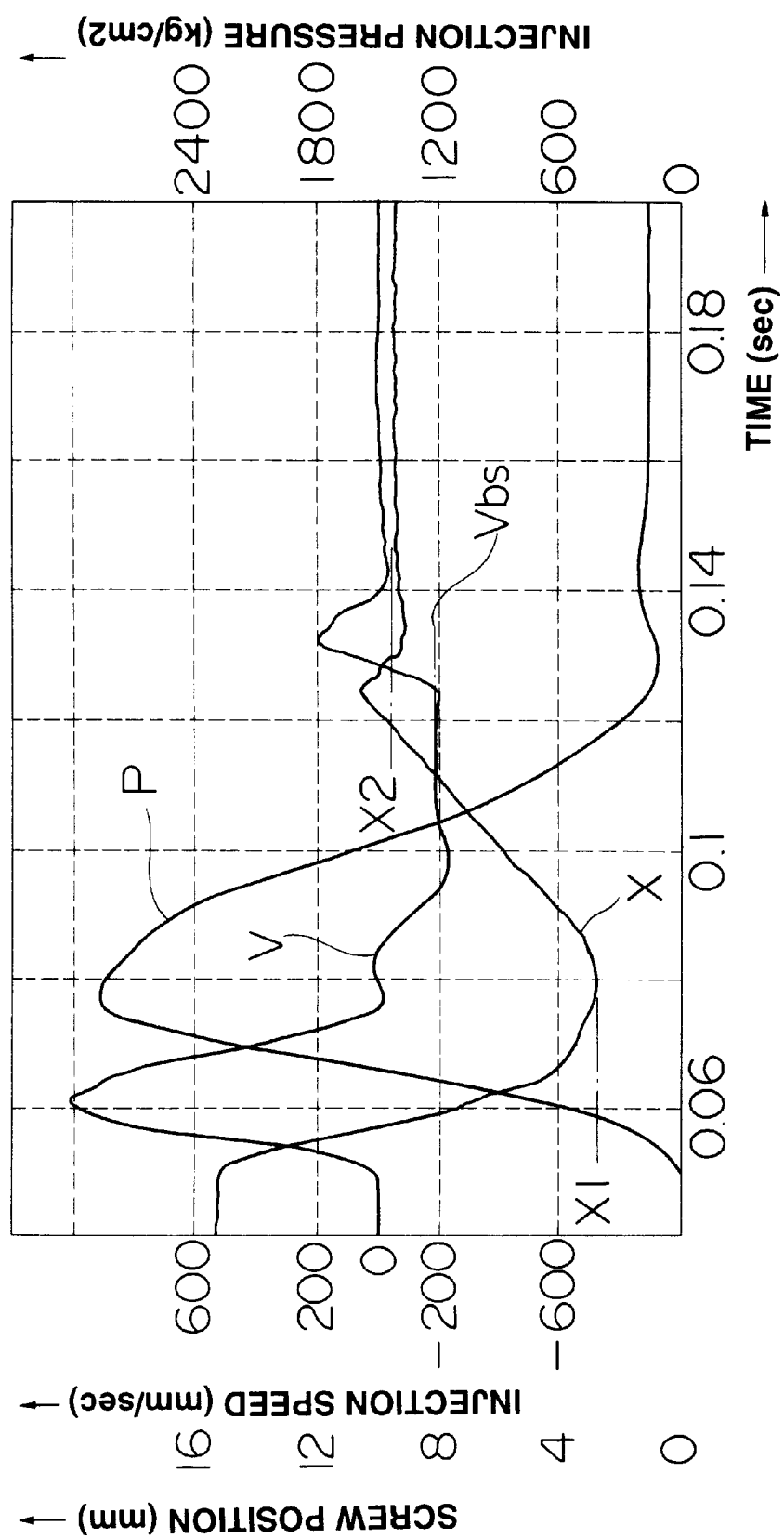
FIG. 3 is a characteristic chart showing changes in various physical values with lapse of time during molding performed in accordance with the injection molding method.
Figure 4:
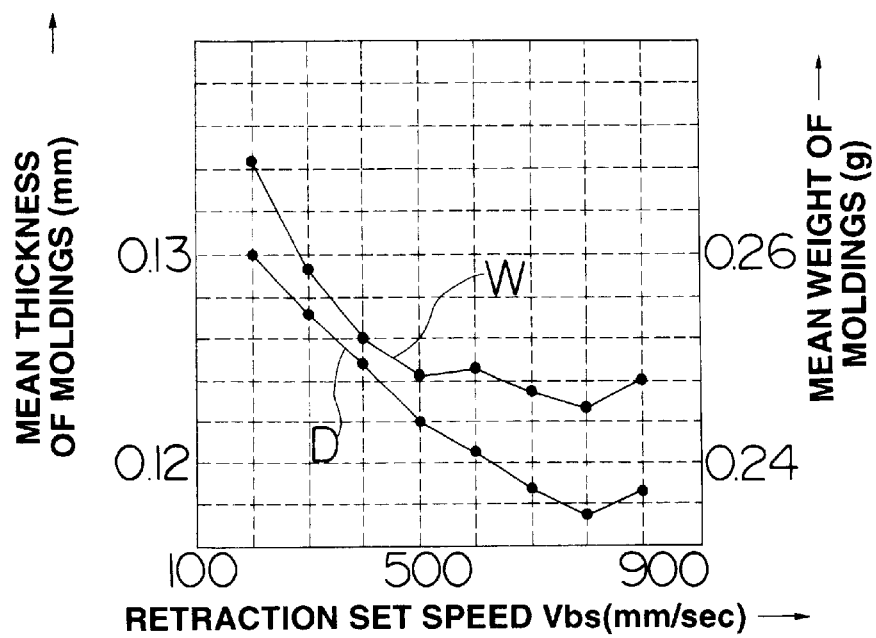
FIG. 4 is a correlation diagram showing the relationship between the thickness and weight of thin molding products and retraction set speed of a screw used in the injection molding method.

Next, the injection molding method according to the present embodiment, including the operation of the injection molding machine 1, will be described with reference to the flow chart shown in FIG. 1, as well as to FIGS. 2–4.

First, through the setting section 42, there is set a first set point X1 corresponding to completion of charge during advancement of the screw 3 (during injection/charge). The first set point X1 is set for the screw position, injection pressure, or injection speed during the advancement of the screw 3. Specifically, the first set point X1 can be set to correspond to the most advanced position of the screw 3 at the end of charge of resin into the cavity C, the maximum injection pressure at that time, the lowest advance speed of the screw 3, or the like. In this case, any one of these physical values may be selected for setting the first set point X1. Alternatively, a set point is provided for each of a plurality of physical values, and when one or more physical values reaches the corresponding set point or points, it is judged that the first set point X1 is reached. In the present embodiment, as shown in FIG. 3, the most advanced position of the screw is set as the first set point X1.

Further, through the setting section 42, there is set a second set point X2. The second set point X2 is set to be located rearward with respect to the first set point X1, and is used as a target position when the screw 3 is retracted from the first set point X1. The second set point X2 is set with respect to the screw position, resin pressure or time during retraction of the screw 3. In this case, any one of these physical values may be selected for setting the second set point X2. Alternatively, a set point is provided for each of a plurality of physical values, and when one or more physical values reaches the corresponding set point or points, it is judged that the second set point X2 is reached. In the present embodiment, as shown in FIG. 3, the position that is rearwardly shifted from the first set point X1 by about 7 mm is set as the second set point X2.

Further, through the setting section 42, a speed Vbs is set for the retraction from the first set point X1 to the second set point X2. As shown in FIG. 3, in the present embodiment, the set speed Vbs is 200 mm/sec. The weight and thickness of the thin molding products become closer to the designed weight and thickness as the set speed Vbs increases. FIG. 4 shows the correlation between the weight W and thickness D of thin molding products M and the set speed Vbs during the retraction of the screw 3. The weight W and thickness D of the thin molding products M decrease as the set speed Vbs increases, and become minimum when the set speed Vbs is 800 mm/sec, in the illustrated example. The set speed Vbs as well as the first and second set points X1 and X2 can be experimentally set in accordance with the material, shape, or the like, of the thin molding products M.

Meanwhile, the molding operation is performed as follows. In the metering step, the screw 3 is rotated in order to meter molten resin. As a result, the screw 3 retracts to the metering end position (injection start position) within the injection barrel 2.

Subsequently, the operation proceeds to the injection step. FIG. 1 shows the operation in the injection step by means of a flowchart. In the injection step, the screw 3 is first advanced from the injection start position at a preset injection speed (step S1). The injection speed may be a single speed or may be set to vary stepwise in plural stages. In FIG. 3, V represents the injection speed of the screw 3, X represent the position of the screw 3, and P represents the injection pressure. Based on the position detected by the position sensor 39, the control section 37 judges whether the screw 3 has reached the first set point X1 (step S2). When the first set point X1 is set with respect to the injection pressure P, the above-described judgment can be performed based on the pressure detected by means of the mold internal pressure sensor 41. Further, when the first set point X1 is set with respect to the injection speed V, the above-described judgment can be performed based on the speed information obtained from the position detected by means of the position sensor 39. Moreover, when the first set point X1 is set with respect to the injection pressure P, the above-described judgment can be performed based on the pressure detected by means of the oil pressure sensor 38 or the nozzle resin pressure sensor 40. Accordingly, the injection pressure can be detected from any one of the mold internal pressure sensor 41, the oil pressure sensor 38, and the nozzle resin pressure sensor 40.

When the screw 3 reaches the first set point X1, the screw 3 is immediately retracted at the set speed Vbs (steps S2 and S3). At this time, feedback control is performed by the control system composed of the control section 37 and the control valve 35 such that the retraction speed of the screw 3 becomes equal to the set speed Vbs. When the screw 3 has moved to the second set point X2, the screw 3 is stopped to complete the injection step (step S4). Accordingly, a separate pressure holding step does not exist in the injection molding method of the present embodiment.

As described above, when the screw 3 reaches the first set point X1 corresponding to completion of charge during the advancement of the screw 3, the internal pressure of the cavity C is relieved quickly. Therefore, the cavity C, which has deformed due to high pressure resin, is restored to its designed shape before the resin solidifies, so that high preciseness and high quality of very thin molding products M can be guaranteed. Further, since the injection pressure can be increased, it is possible to cope with changes in the shape of thin molding products M such as a decrease in thickness or an increase in area, thereby enabling use for general purpose and expanded use.

The present invention is not limited to the above-described embodiment. Regarding structural details, approaches, and the like, modifications and any omission or addition may be possible as needed without departing from the scope of the invention.

For example, although the exemplified injection molding machine is of a hydraulic drive type, the present invention can be applied to injection molding machines of other drive types such as an electric-motor drive type using a servomotor, an air drive type using pressurized air, or the like. Similarly, the present invention can be applied to injection molding machines operating base on different principles such as a preplasticating (plunger) injection molding machine. Moreover, when an existing injection molding machine is utilized, the V-P changeover point (speed-pressure changeover point) may be used as the first set point X1.

In the present invention, immediately after the screw 3 reaches the first set point X1, the screw 3 is forcibly retracted to the second set point X2. The term "immediately" is used herein to encompass the case where the screw 3 is stopped at the first set point X1 for a short period of time (not greater than 1 second) and the case where the screw 3 is retracted at a slow speed, as well as the case where the screw is retracted instantaneously. If the screw 3 is retracted instantaneously after the screw 3 has reached the first set point X1, pressure release can be performed completely. However, if the retraction movement from the first set point X1 is delayed slightly, the pressure release becomes incomplete accordingly. This phenomenon enables fine adjustment of the thickness of the thin molding products.

What is claimed is:

1. An injection molding method for an injection molding machine in which molten resin in an injection barrel is injected and charged into a cavity of a mold through advancement of a screw in order to form a thin molding product, the method comprising the steps of:

moving a screw at a first predetermined speed to a first set point that is set in advance and corresponds to completion of charge during the advancement of said screw; and immediately and forcibly retracting said screw at a second predetermined speed to a second set point that is set in advance, wherein said second set point corresponds to a complete molding cycle of the injection molding machine.

2. The injection molding method according to claim 1, wherein said first set point is experimentally set for the thin molding product.

3. The injection molding method according to claim 1, wherein said second set point is experimentally set for the thin molding product.

4. The injection molding method according to claim 1, wherein said first set point is set with respect to the position of said screw during the advancement of said screw.

5. The injection molding method according to claim 1, wherein said first set point is set with respect to the injection pressure during the advancement of said screw.

6. The injection molding method according to claim 1, wherein said first set point is set with respect to the injection speed during the advancement of said screw.

7. The injection molding method according to claim 1, wherein said second predetermined speed is experimentally set for the molding product.

8. The injection molding method according to claim 1, wherein said second set point is set with respect to the position of said screw during the retraction of said screw.

9. The injection molding method according to claim 1, wherein said second set point is set with respect to the pressure of resin during the retraction of said screw.

10. The injection molding method according to claim 1, wherein said second set point is set with respect to time during the retraction of said screw.

11. The injection molding method according to claim 1, wherein said first set point is determined at least during a movement of said screw.

12. The injection molding method according to claim 1, wherein the retraction from said first set point occurs after a maximum injection pressure occurs.

13. The injection molding method according to claim 1, wherein said screw is immediately and forcibly retracted within a second of reaching said first set point.

14. The injection molding method according to claim 1, wherein said second set point is set based on said first set point.

* * * * *